Patented Nov. 6, 1923.

1,473,059

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS.

CLEANER ATTACHMENT FOR COTTON-GIN FEEDERS.

Application filed February 19, 1923. Serial No. 620,004.

*To all whom it may concern:*

Be it known that I, JOHN ARNOLD STREUN, a citizen of the United States, residing at Sherman, Grayson County, Texas, have invented a certain new and useful Improvement in Cleaner Attachments for Cotton-Gin Feeders, of which the following is a full, clear, and exact description, such as will enable others skilled in the art to which it appertains to make and use the same.

My invention relates to cleaning attachments for gin feeders and it has particular application in handling the poorer grades of cotton in feeding the same to the gin.

It is an object of my invention to provide an efficient cleaning and agitating attachment for gin feeders, which will break up the bolls and remove burrs and trash before feeding the cotton to the gin.

Figure 1:
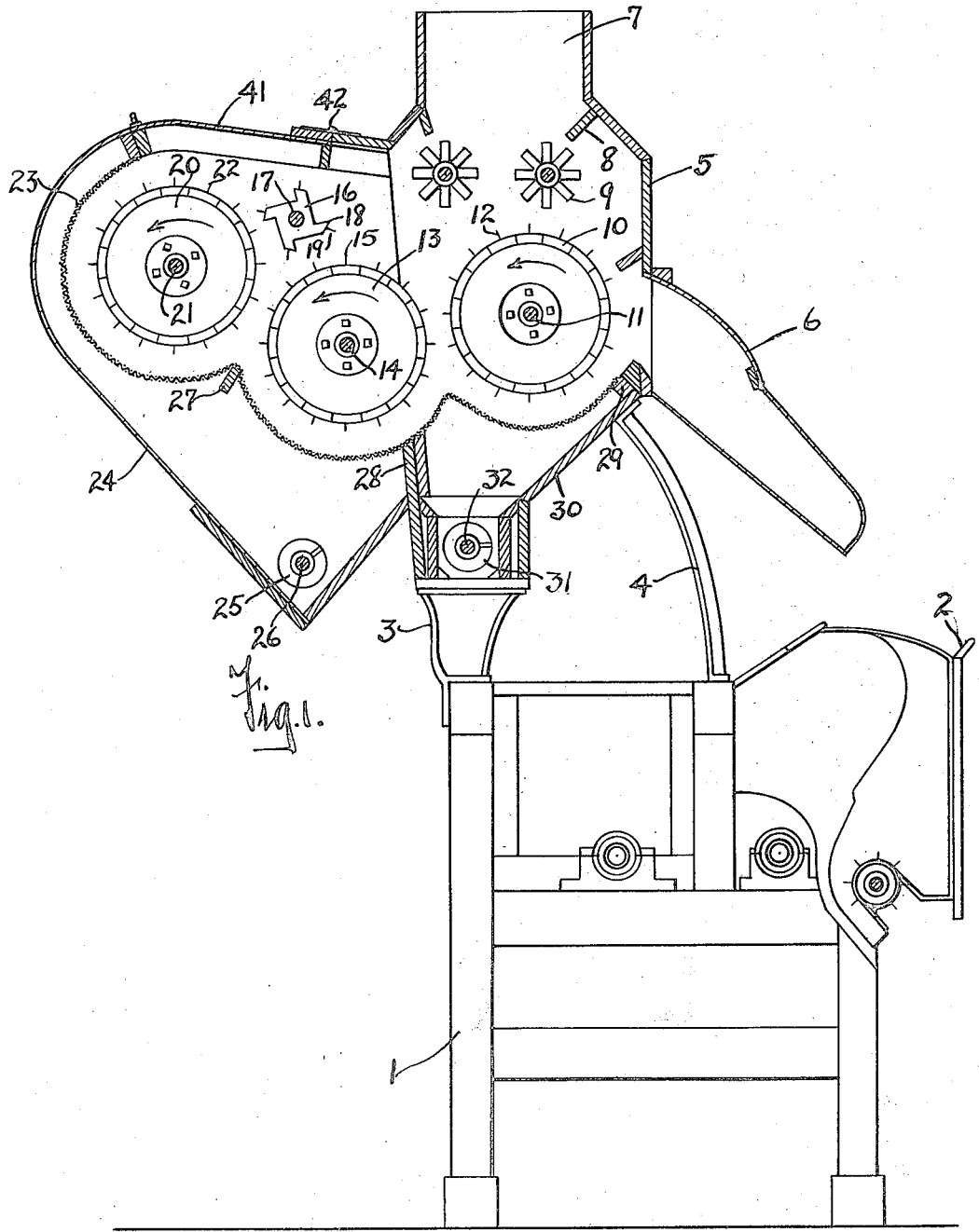
Figure 2:
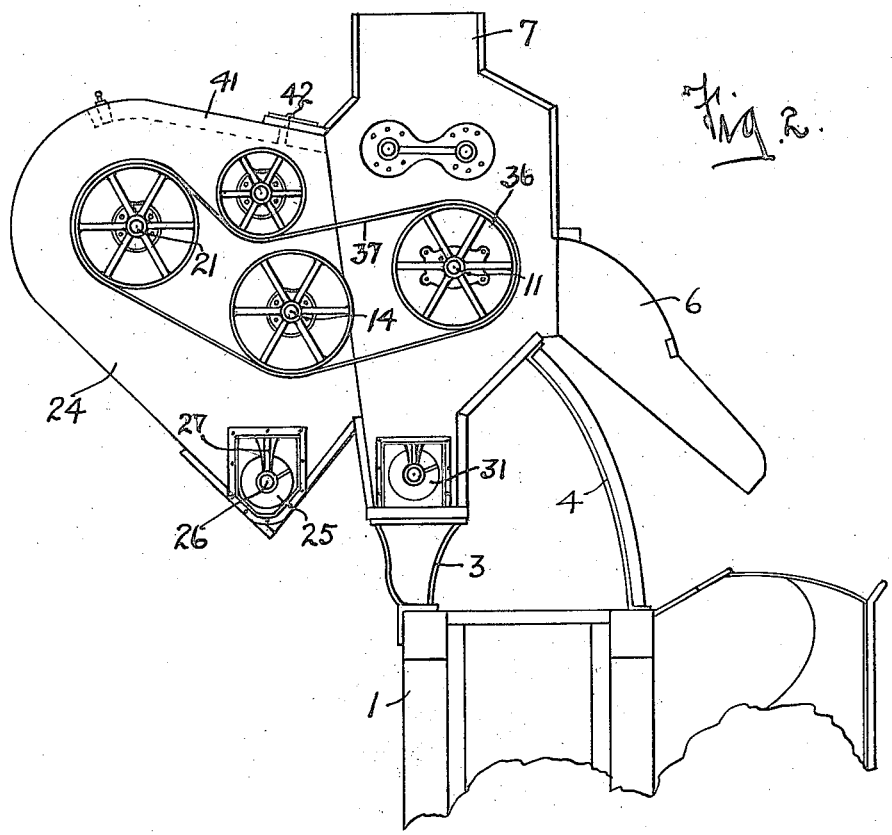
Figure 3:
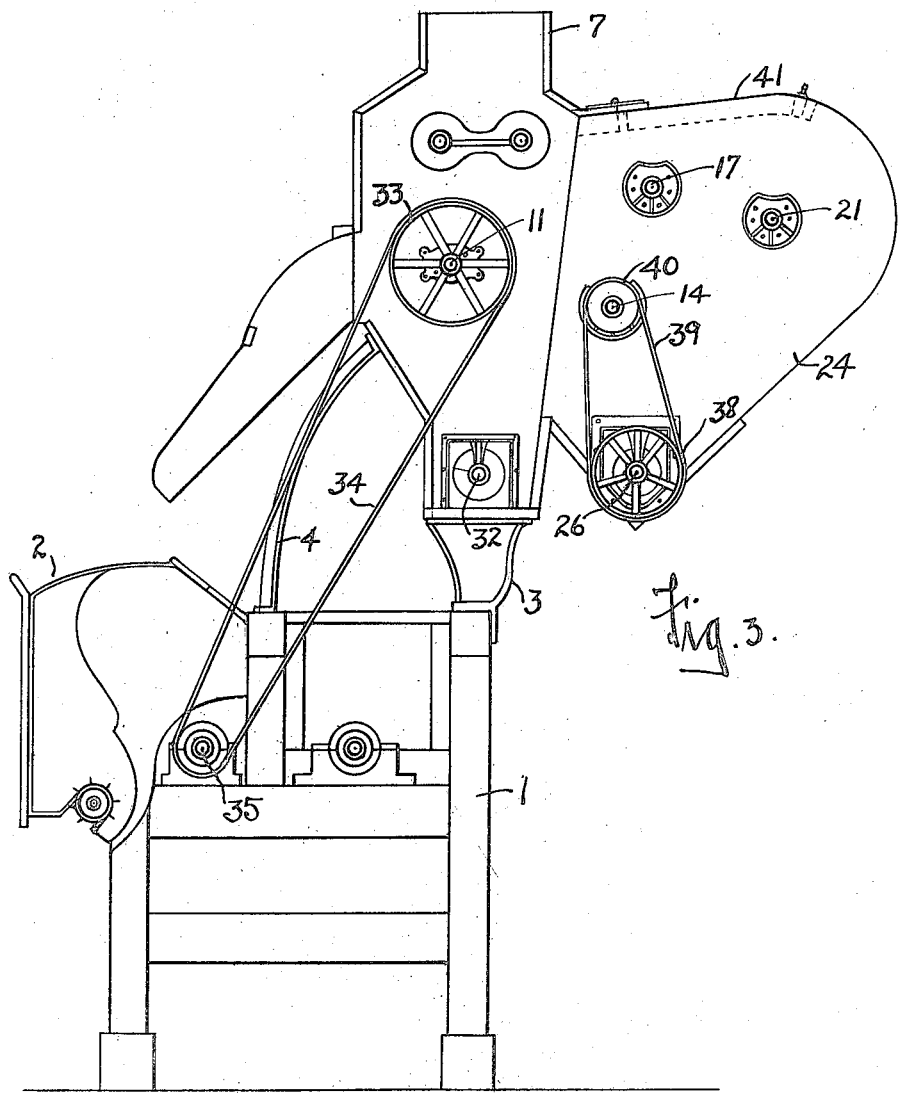

Referring to the drawings herewith, wherein the preferred embodiment of my invention is shown, Fig. 1 is a side elevation of a gin showing my feeder attachment thereon, one side of said attachment being removed to show the interior thereof; Fig. 2 is a side elevation of the attachment, certain parts of the gin itself being broken away; Fig. 3 is a side elevation taken from the opposite side of the gin and feeder and showing the method of driving the rollers. Like numerals are applied to like parts in all the views.

In the drawings, I have illustrated more or less diagrammatically an ordinary type of cotton gin, mounted on upright supports 1, and having at the forward side of said gin an opening at 2, to receive the cotton which is to be ginned. Above the gin, and supported thereon by brackets 3 and 4, is a feeder, 5, from which the cotton is fed through a chute 6, to the opening 2 in the gin.

The feeder 5, as here shown, is of ordinary construction, having an upper hopper, 7, with baffles 8 at the lower end thereof directing the cotton between two feeding rollers 9. Below said feeding rollers and slightly to the forward side of said feeder, is a feeder cylinder 10. This cylinder is mounted upon a shaft 11, and has radial pins 12 thereon to seize the cotton and carry it toward the chute 6.

The feeder cylinder 10 rotates in a counter clockwise direction, as seen in Fig. 1, and would ordinarily carry the cotton around underneath the said cylinder, toward the chute, but I have provided a cleaning attachment to the rear of said feeder, comprising a picker cylinder 13, which is slightly below the level of the feeder cylinder and adapted to receive the cotton from the feeder cylinder and carry it upwardly to the rear of the feeder. The picker cylinder is similar in construction to the feeder cylinder 10, being mounted upon a shaft 14 and having radial pins 15 thereon to receive the cotton. These pins, in taking the cotton from the feeder cylinder, are adapted to tear up the bolls and trash, and throw it rearwardly against an agitating roller, 16. This roller is provided with four agitating blades, arranged to project in a direction tangential to the shaft 17 upon which the roller is mounted. Each of the blades 18 has a series of outwardly projecting pins 19 thereon, to tear up the cotton and loosen the same. The agitating roller is midway between the picker cylinder 13 and the cleaning cylinder 20, said cleaning cylinder being above and to the rear of the picker cylinder. The construction of the cleaning cylinder is similar to that of the two preceding cylinders, and is mounted upon a shaft 21, having bearings in the side of the housing. It is provided with radial pins or teeth, 22, adapted to seize the cotton as it is thrown upwardly by the agitating roller, and carry the said cotton and trash rearwardly against a foraminous screen 23 through which the finer particles of dirt and chaff may be sifted into the housing 24 of the cleaner. The side of said housing below the cleaner cylinders is inclined downwardly toward the lower side, to conduct the dirt and chaff into the path of a screw conveyor 25, mounted on a shaft 26 having bearings in hangers 27 in the sides of the housing. This conveyor moves the chaff to one end thereof where it is discharged from the housing into any desirable receptacle, not shown.

The screen 23 is curved inwardly between the cylinders 13 and 20, and supported by means of a cross bar, 27. The screen is directed downwardly around the cylinder 13, and supported again upon an upright wall or partition 28, dividing the feeder from the cleaner attachment. Beyond this wall the screen is curved upwardly and down again around the feeder cylinder 10 and attached at its forward end to blocks 29 on the forward side of the housing. Below that portion of the screen within the feeder, the forward wall 30 is inclined downwardly to conduct dirt and chaff to a second screw conveyor 31, mounted upon a shaft 32, by means of which the dirt is forced from one side of the feeder in the usual manner.

The cylinders and rollers connected with my device are operated from the feeder cylinder 11, by means of a pulley 33 on one end thereof, said pulley being connected by means of a belt 34 to a driven shaft 35 upon the gin. The opposite end of the shaft 11 upon which the pulley 33 is mounted, is provided with a second pulley 36. Each of the cylinder shafts 14 and 21, and also the agitating shaft 17, are provided with pulleys thereon, the said agitating shaft having a pulley of smaller diameter whereby the speed of the agitator may be increased beyond that of the cylinders. A belt 37 connects in an operative way the four shafts 11, 14, 17 and 21, by means of the pulleys thereon, so that the three cylinders 10, 13 and 20 are driven in the same direction, but the agitating roller 16 is rotated in the direction opposite to that of the cylinders. The conveyor shaft 26 has on one end thereof a pulley 38 connected by means of a belt 39 to a pulley 40 on the end of the shaft 14, thereby causing the rotation of the same in the operation of my device.

In the use of my cleaner attachment, the cotton is fed to the feeder roller 10 between the guide rollers 9, and is caught by the teeth on said cylinder and carried to the rear, and is there caught by the teeth upon the cylinder 13 and torn from the feeder cylinder, and dirt and chaff thereon shaken from the cotton, so that it may drop downwardly between the rollers and through the screen 23 to the conveyors. The cotton thus taken by the picker cylinder 13 is carried upwardly into the path of the agitator roller 16, which is rotated at a higher rate of speed than the cylinder, and serves to break up the bolls of cotton and tear the burrs and chaff from the lint. The lint thus broken up, is carried to the rear and downwardly around the cleaner and picker cylinders, and over the screen, to the feeder cylinder, which carries it forwardly and discharges it into the chute 6 leading to the gin.

By arranging the picker and cleaner cylinders of my attachment in the position shown, relative to the feeder cylinder, I obtain a most desirable cleaning action. The cotton is carried both rearwardly and upwardly, thus allowing the dirt and chaff to be shaken out during the course of the travel of the cotton. The bolls and chaff carried from the picker to the cleaner cylinders, are efficiently broken up and torn to pieces by the agitator roller 16, so that when the cotton is carried over the cleaner cylinder 20 and downwardly against the screen, the chaff and dirt will be almost entirely eliminated. By this particular arrangement, I obtain a cleaning action not otherwise obtained by devices now in use. The cotton thus treated is much superior to the cotton fed directly to the gin, without this cleaning action.

In the upper side of the housing connected with my cleaner, I provide a door 41, hinged at 42, so that access may be obtained to the cleaner at any time, even during the operation of the device.

Having thus described my device, the further advantages of which will be obvious to one skilled in the art, what I claim is new and desire to protect by Letters Patent, is:

1. The combination of a gin feeder comprising guide rollers and a feeder cylinder, with an attachment including a picker cylinder positioned to the rear of and below said feeder cylinder, a cleaning cylinder to the rear of and above said picker cylinder, a knocker roller to the rear of said picker cylinder having agitating blades thereon adapted to break up the cotton, means of driving said cylinders in the same direction, and to rotate said knocker roller in the opposite direction, and a screen below said cylinders and roller, in the manner described.

2. The combination of a gin feeder comprising guide rollers and a feeder cylinder, with an attachment comprising a plurality of cylinders arranged to conduct the cotton from the feeder cylinder in an upward and rearward direction, means between said cylinders to break up the cotton passing thereover, and a screen below said cylinders to allow the passage therethrough of dirt and chaff.

3. The combination of a gin feeder with an attachment therefor comprising a picker cylinder, a cleaner cylinder adjacent to and above said picker cylinder, means to rotate said cylinders in the same direction, an agitating roller rotatable in the opposite direction having blades thereon adapted to break up the bolls and chaff in the cotton, and means to allow the passage of dirt and chaff downwardly away from the said cylinders.

4. In a gin feeder, a cleaner attachment comprising a cylinder positioned adjacent the feeder and adapted to receive the cotton therefrom, a cleaner cylinder above and to the rear of said picker cylinder, means adjacent said cylinders to agitate and break up the cotton passing over said cylinders, and means below said cylinders whereby the dirt may be eliminated from the cotton.

5. In combination with a gin feeder comprising guide rollers and a feeder cylinder, an attachment including a picker cylinder positioned at one side and slightly below said feeder cylinder, a cleaning cylinder behind and above said picker cylinder, a knocker roller between said picker and cleaner cylinders and a sifter screen partially surrounding said cylinders on the lower sides thereof, said cylinders being adapted to all rotate in the same direction.

In testimony whereof, I hereunto affix my signature, this the 12 day of Feb., A. D. 1923.

JOHN ARNOLD STREUN. [L. S.]